April 17, 1951  R. A. RAPUANO  2,549,385
TEST SET FOR RADAR APPARATUS
Filed Feb. 7, 1946  2 Sheets-Sheet 1

*INVENTOR.*
ROBERT A. RAPUANO
BY M. C. Hayes
ATTORNEY

April 17, 1951 R. A. RAPUANO 2,549,385
TEST SET FOR RADAR APPARATUS
Filed Feb. 7, 1946 2 Sheets-Sheet 2

*INVENTOR.*
ROBERT A. RAPUANO
BY
ATTORNEY

Patented Apr. 17, 1951

2,549,385

UNITED STATES PATENT OFFICE 2,549,385

TEST SET FOR RADAR APPARATUS

Robert A. Rapuano, Cambridge, Mass., assignor, by mesne assignments, to the United States of America as represented by the Secretary of the Navy Application February 7, 1946, Serial No. 646,167

4 Claims. (Cl. 171—95)

This invention relates to a guided wave transmission system and more particularly to a guided wave transmission system design for a radio frequency power test set.

The advantages of quantitative measurement of the performance of microwave radars and other high frequency apparatus in the field have become well known. In general, it has been found that if adequate test equipment is not employed, radio frequency performance is likely to be seriously low without being apparent to operating and maintenance personnel. The intelligent use of test equipment greatly facilitates both the recognition and the correction of troubles.

Radio frequency performance testing is based fundamentally on the use of suitable test equipment to measure the ability of a transmitter to radiate powerful radio frequency pulses and the ability of a receiver to detect weak returning pulses. The result of these measurements are expressed as numerical figures for transmitter performance, receiver performance, or radar performance. The measured performance figures are compared with standard figures based upon the design characteristics of the radar. The practical importance of this kind of testing is that by a small number of tests one can determine whether or not a receiver, a transmitter, or a radar actually needs servicing. When radio frequency performance is found satisfactory no time need be wasted in checking individual radio frequency components. When servicing is required, the over all tests enable one to evaluate the results of replacements or adjustments, and to know when the work is completed.

The importance of maintaining performance at a high level lies, of course, in the fact that the greater the radar performance figure attained within a given radar, the greater is the ability of that radar to detect small or distant targets.

Three general types of coupling for radio frequency power test equipment to the radar are in use; pickup dipoles or horns, probes inserted into the transmission line, and directional couplers attached to the transmission line. Of these the directional coupler is by far the most satisfactory. The use of a pick up antenna, which is not directly coupled to the radar, involves the determination of a space attenuation between the radar antenna and that of the test equipment. This determination is subject to a number of difficulties and possibilities of error and often makes the use of this method inadvisable.

The probe method of coupling is not generally recommended because the power taken from the transmission line at a probe varies with the amplitude and phase of the standing waves in the line and with the depth of the probe insertion into the line.

The directional coupler provides a means of taking radio frequency (R. F.) power from a guided wave transmission line or feeding power into the R. F. line, between the TR box and the antenna system, with a fixed value of attenuation at the coupling and is not subject to influence by standing waves. It is directional because power fed into the line through the coupler, or vice versa is transmitted only in the desired direction along the line. The percentage of power transmitted in the reverse direction is known from calibration of the coupler and is usually so small as to be negligible.

In the conventional type of R. F. power test set using a power divider, the ratio of power split, depends upon the impedance of the wave guide in either direction as seen from the point of power split. This apparent impedance is of course related to the power reflected from both ends of the power divider, and hence, any variation in the voltage standing wave ratio will alter the power split and destroy the calibration of the test set.

In accordance with the present invention and as is explained more fully hereinafter, the above-mentioned difficulties are substantially eliminated.

The principal object of this invention is to provide a guided wave transmission system for a radio frequency power test set, which allows measurements to be made over wide ranges of radio frequency power.

Another object of this invention is to provide a guided wave transmission system, for a radio frequency power test set, so designed that the fractional power supplied to a thermistor bead is substantially independent of the voltage standing wave ratio.

A further object of this invention is to provide, in a guided wave transmission system for a radio frequency power test set, a combination of forward and backward directional couplers, so positioned that the fractional radio frequency power transmitted to a thermistor bead is substantially independent of the voltage standing wave ratio.

These and other objects will be apparent from the following specification when taken with the accompanying drawings, in which.

For simplicity the directional couplers are indicated in symbolic form, and similar parts appearing in Figs. 1, 2, 3 and 4 are labeled with like reference numbers.

Figure 1:
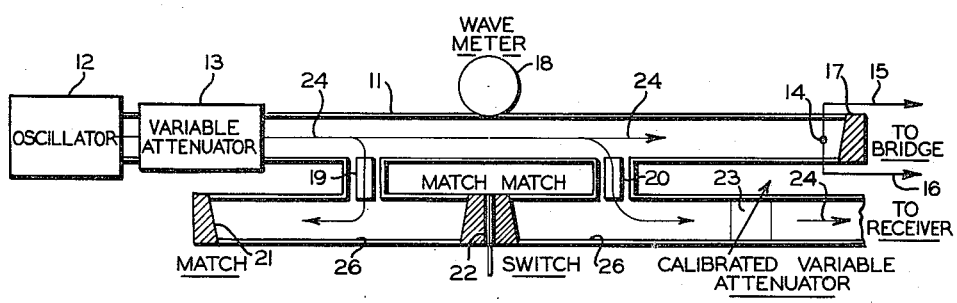
Fig. 1 represents a simplified drawing of an embodiment of the invention for the measurement of receiver sensitivity.

In Fig. 1, an embodiment of the invention arranged to measure receiver sensitivity, R. F. power from oscillator 12, supplied to both a thermistor bead 14 and a receiver connected to waveguide 26, is fed through variable attenuator 13 into wave guide 11. Thermistor bead 14 is the sensitive element of a power level bridge connected to this thermistor bead 14 by way of terminals 15 and 16. Thermistor bead 14 is composed of a semiconducting material, such as uranium oxide or silver sulphide, having a relatively large negative temperature coefficient of resistance. Changes in energy level in wave guide 11 will result in corresponding changes in the energy absorbed by thermistor bead 14. The bridge circuit connected to terminals 15 and 16 may be calibrated to measure the power level in wave guide 11 or may simply indicate when this power level is at a preselected value. Variable attenuator 13 makes possible the adjustment of R. F. power admitted to wave guide 11 so that a standard power level can be maintained as indicated by the power meter in the bridge circuit connected to terminals 15 and 16 of which thermistor bead 14 is the activated element. Attenuator 13 may be any of the circuit elements well known in the art that will reduce the power level of the output of the oscillator 12 to the desired standard power level in wave guide 11. For purpose of this invention, attenuator 13 need not be calibrated. One convenient form of attenuator comprises a wave guide section having a slot formed therein through which a sheet of lossy material may be inserted. The energy absorbed by the attenuator, hence the reduction in power level of the energy passing therethrough, will be a function of the amount of the lossy material introduced into the wave guide. Wave meter 18 for determining the wave length, and therefore frequency, is mounted on wave guide 11 in a suitable manner between backward directional coupler 19 and forward directional coupler 20. Wave meter 18 is preferably a calibrated cavity resonator coupled to wave guide 11 through a suitable probe or aperture. Short circuit 17 is part of the tuning used to match thermistor 14 to the line and substantially prevents any R. F. power reflection from that end of wave guide 11.

Figure 2:
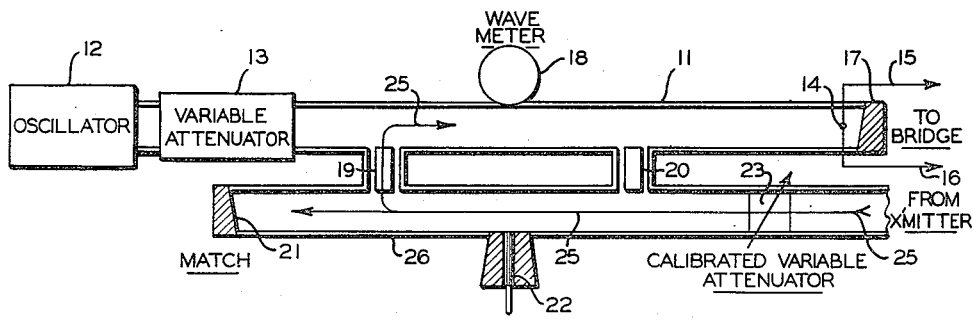
Fig. 2 represents a simplified drawing of the same embodiment adjusted for the measurement of transmitter power.

Backward directional couplers 19 and forward directional coupler 20 couple R. F. power from wave guide 11 into wave guide 26 and vice versa and may be of any conventional design. These directional couplers comprise means for coupling energy from one guided wave transmission line into a second guided wave transmission line. In one such coupler, the type illustrated conventionally in the drawing, the energy passes from the first line to the second line through two apertures joining the first and second lines. The distance between the apertures is one-quarter wave length at the oscillator frequency, or any odd multiple thereof. This placement allows the energy to pass only in a predetermined direction in the second line, the energy tending to pass in the opposite direction through the two apertures being substantially one hundred and eighty degrees out of phase and effectively canceled. The designation "forward directional coupler" is used to indicate that energy, traveling from left to right in wave guide 11 and passing through forward directional coupler 20, will be propagated in the same (left to right) or forward direction in wave guide 26. Similarly, energy passing through backward directional coupler 19 will be propagated in the reverse or backward direction in wave guide 26. This action of directional couplers is illustrated by arrows 24 and 25 in Figs. 1 and 2, respectively. Arrows 24 and 25 will be explained in greater detail presently. The forward or backward characteristics of a directional coupler depends upon the design of the coupler and more specifically the placement and spacing of the apertures and the spacing between wave guides 11 and 26. Impedance matching pad 21 substantially prevents reflection of any R. F. power reaching that end of wave guide 26. Pad 21 may be any absorptive type termination which terminates wave guide 26 in its characteristic impedance. Switch 22, providing an impedance match in each direction, effectively blocks wave guide 26 as shown in Fig. 1 when the test set is being used to measure receiver sensitivity. Switch 22 comprises two matched terminations similar to pad 21 but arranged back to back. The switch 22 may be moved into wave guide 26, as shown in Fig. 1, or withdrawn from wave guide 26, as shown in Fig. 2. Calibrated variable attenuator 23, calibrated to read the R. F. power level directly in decibels (dbm.) above (+) and below (−) the zero level of one milliwatt, controls the output to the lowest discernible level when measuring receiver sensitivity, and as a calibrated attenuator in wave guide 26 when R. F. power from a transmitter is fed into the set as in Fig. 2. Attenuator 26 may be similar in construction to attenuator 13, previously described.

When it is desired to test a radar receiver, the wave guide 26 is connected by flexible or rigid wave guides to the receiver. A convenient method of making this connection is to place a directional coupler in the R. F. power line of the radar set including the receiver between the transmit-receive box and the antenna system of the radar set. The transmission path of R. F. power from oscillator 12 to the receiver is indicated by arrow 24.

In Fig. 2 an embodiment of the invention arranged to measure the R. F. power of the radar transmitter of the radar set mentioned above, oscillator 12 is off, matched attenuating switch 22 is removed from wave guide 26 and R. F. power as indicated by arrow 25 is fed into the set from the radar transmitter.

In Figs. 1 and 2 the forward directional coupler 20 has high attenuation, about 40 db, while the backward directional coupler has an attenuation of about 10 db. This attenuation, like the direction of propagation, depends upon the design of the directional coupler, for example, the size of the apertures employed in the coupler.

In Fig. 1 the power which passes through the 10 db backward directional coupler 19 is of no significance because it is absorbed in the matched termination 21. The R. F. power going to the receiver (not shown) is substantially independent of any voltage standing wave ratio produced by a mismatch of the thermistor mount containing thermistor bead 14. This is true because the R. F. power split between the thermistor bead 14 and the receiver (not shown) takes place in the incident wave from the oscillator 12 only. Practically none of the reflected waves from thermistor bear 14 reaches the receiver, because if it does pass through the 40 db forward directional coupler 20, it is merely absorbed at switch 22. The only effect of a moderately varying voltage standing wave ratio is therefore a very slight variation in the R. F. power absorbed by the thermistor bead 14, which effect is negligible.

The arrangement shown in Fig. 2 is the same device as in Fig. 1 being used for measurement of transmitter output. Switch 22 is now open, and it is observed that R. F. power from the radar transmitter (not shown) reaches thermistor bead 14 through the 10 db backward directional coupler 19. The difference in the attenuation of the two directional couplers 19 and 20 takes care of the different requirements for measurement of receiver sensitivity as compared with one of transmitter output, thus making it possible to use the same calibrated attenuator 23. In the circuit shown in Fig. 2, practically no R. F. power goes in the direction of oscillator 12. The ratio of the R. F. power supplied to thermistor bead 14 as compared with the total transmitter R. F. power is obviously independent of voltage standing wave ratio, as desired.

Figure 3:
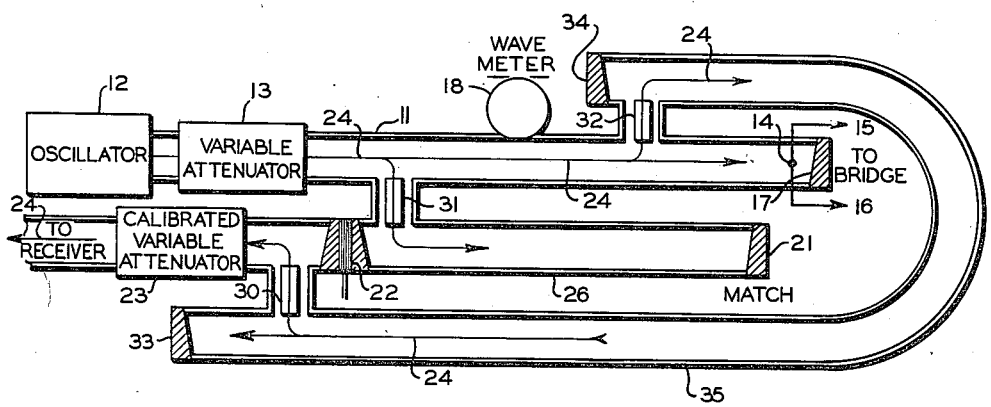
Fig. 3 represents a modification of the embodiment of Fig. 1, only forward directional couplers being used.
Figure 4:
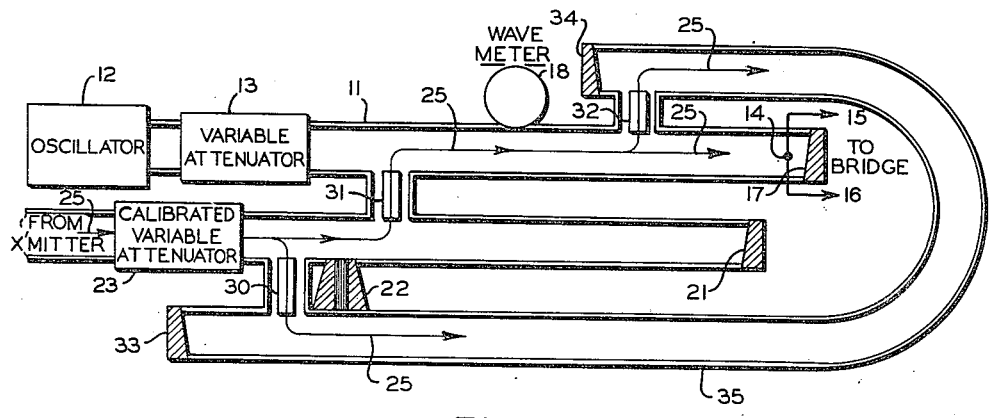
Fig. 4 represents a modification of the embodiment of Fig. 2, only forward directional couplers being used.

Inasmuch as it is difficult to obtain a satisfactory backward directional coupler, the arrangement shown in Figs. 3 and 4 substituting three forward directional couplers 30, 31 and 32 for the combination in Figs. 1 and 2 of backward directional coupler 19 and forward directional coupler 20, may be used.

The addition of a third section of wave guide 35 and matched terminations 33 and 34 are made necessary in the modification illustrated in Figs. 3 and 4. From an inspection of Figs. 3 and 4 it can be seen that the actual device is a modification of and is equivalent in theory to Figs. 1 and 2, Fig. 3 being arranged to measure receiver sensitivity and Fig. 4 arranged to measure transmitter power. Because of the directional nature of the couplers 30, 31 and 32, the low reflection at the matched terminations 17, 21, 33 and 34, and the attenuation provided by the directional couplers, the device is extremely insensitive to mismatch of the thermistor mount.

Referring now to Fig. 1 for a description of the operation of the test set to check the sensitivity of a radar receiver, the end of transmission line 26 is coupled to the line between the antenna of the radar system and the receiver. Variable attenuator 13 is adjusted so that the energy from oscillator 12 present in transmission line 11 has a standard amplitude, as measured by thermistor bead 14 and the bridge circuit associated therewith. If the amplitude of energy in transmission line 11 is known and the attenuation through directional coupler 20 is also known, the amplitude of the energy in transmission line 26 to the left of calibrated variable attenuator 23 will be some preselected value. With variable attenuator 23 set to give a minimum of attenuation, strong signals should be received at the receiver. As the attenuation of attenuator 23 is increased, the amplitude of the signals at the input to the receiver will correspondingly decrease until a point is reached at which the signals will no longer be detected by the receiver. The setting of attenuator 23 at which the receiver just detects a signal from oscillator 12 is a convenient measure of the sensitivity of the receiver. During the test of the receiver, some energy from oscillator 12 will pass through directional coupler 19, but any energy passing through this directional coupler 19 will be absorbed by the matching termination 21 and switch 22.

If the invention is to be used to measure the power output of a radar transmitter, wave guide 26 of Fig. 2 may be connected to the output of the transmitter. A convenient place to make this connection is in the transmission line between the transmitter and the antenna. It is conventional to couple the receiver and transmitter of a radar system by means of a transmit-receive switch with but one transmission line connecting the transmit-receive switch to the antenna. Therefore, one connection to the transmission line between the transmit-receive switch and the antenna will serve to couple both the receiver and the transmitter to the test set.

Referring to Fig. 2, when the transmitter is being tested, energy passes through variable attenuator 23 through directional coupler 19 to thermistor bead 14, where the amplitude of the energy is measured by thermistor bead 14 and the associated bridge circuit. If calibrated attenuator 23 is adjusted so that the bridge circuit indicates that a preselected standard amount of power is being received by thermistor bead 14, the setting of variable attenuator 23 will indicate the amplitude above this standard being supplied by the transmitter. The amplitude of the signal from the transmitter is a convenient indication of the operating condition of the transmitter. As previously mentioned, coupler 19 has a higher attenuation than coupler 20. This is necessary since the output from the transmitter will normally be much greater than the signal from oscillator 12. By introducing different attenuations in couplers 19 and 20, the same calibration can be used on attenuator 23.

Some energy will pass through coupler 20 in the direction of attenuator 13 when a transmitter is being tested. This energy will be propagated along the transmission line 11 through attenuator 13, and will not be reflected in the direction of thermistor bead 14.

The embodiment of the invention shown in Fig. 3 operates as follows. Variable attenuator 13 is adjusted so that thermistor bead 14 absorbs a predetermined amount of power as indicated by the bridge circuit. The power level in transmission line 11 will then be at some preselected value. Since the attenuation through directional coupler 32 is some known value, the energy within transmission line 35 is also at some preselected, but lower, value. Following the energy through directional coupler 30, the energy in transmission line 26, to the right of the calibrated variable attenuator 23, is at some preselected known value. This energy is attenuated by attenuator 23 until signals are barely detected by the receiver. At this point attenuator 23 provides an indication of the sensitivity of the receiver in the same manner that attenuator 23 of Fig. 1 provided such a measure of sensitivity. It should be noted that the directional coupler 20 of Fig. 1 has now been replaced by directional coupler 32, transmission line 35 and directional coupler 30 of Fig. 3.

Referring now to Fig. 4, when a transmitter is being tested, energy passing from the transmitter through attenuator 23 passes through directional coupler 31 to thermistor bead 14, where the amplitude of the energy is measured. It will be seen that energy passing through directional couplers 30 and 32 never reaches thermistor bead 14, and therefore, is not measured by the associated bridge circuit.

It is to be clearly understood that the description and illustrations of the invention made above has been given only by way of example and not as a limitation on the scope of the invention as set forth in the objects and the accompanying claims.

What is claimed is:

1. A radio frequency power test set for testing ultra high frequency radio equipment comprising, first, second and third guided wave transmission lines, each of said transmission lines having a first and second end, means terminating said second end of each of said transmission lines and said first end of said third transmission line in a matched termination, a source of radio frequency energy coupled to said first end of said first transmission line, a first directional coupler coupling a point in said first transmission line at a point adjacent said second end thereof to a point in said third transmission line adjacent said first end thereof, a second directional coupler coupling a point in said third transmission line adjacent said second end thereof to a point in said second transmission line adjacent said first end thereof, a third directional coupler coupling a point in said second transmission line intermediate said second directional coupler and said second end of said second transmission line to a point in said first transmission line adjacent said first end thereof, power measuring means disposed in said first transmission line at a point intermediate said first directional coupler and said second end of said first transmission line, coupling means coupled through attenuating means to said first end of said second transmission line, said coupling means being adapted to receive said radio equipment to be tested and a two position switch means disposed in said second transmission line intermediate said second and third directional couplers, said switch means when in said first position effectively blocking said second transmission line between said second and third directional couplers, said switch when in said second position permitting uninterrupted flow of energy through said section of said second transmission line between said second and third directional couplers.

2. A radio frequency power test set for alternatively testing the power output level of a radio transmitter and the input power sensitivity of a radio receiver comprising, first, second, and third guided wave transmission lines, each of said transmission lines having a first and a second end, means terminating said second end of each of said transmission lines and said first end of said third transmission line in a matched termination, a source of radio frequency energy coupled to said first end of said first transmission line, a first directional coupler coupling a point in said first transmission line at a point adjacent said second end thereof to a point in said third transmission line adjacent said first end thereof, a second directional coupler coupling a point in said third transmission line adjacent said second end thereof to a point in said second transmission line adjacent said first end thereof, a third directional coupler coupling a point in said second transmission line intermediate said second directional coupler and said second end of said second transmission line to a point in said first transmission line adjacent said first end thereof, power measuring means disposed in said first transmission line at a point intermediate said first directional coupler and said second end of said first transmission line, coupling means coupled to said first end of said second transmission line, said coupling means being adapted to receive alternatively the output circuit of said radio transmitter to be tested and the input circuit of said radio receiver to be tested, and a two position switch means disposed in said second transmission line intermediate said second and third directional couplers, said switch means when in said first position effectively blocking the transmission of energy in the section of said second transmission line between said second and third directional couplers thereby adapting said test set to test the power input sensitivity of said receiver, said switch means when in said second position permitting the transmission of energy in said section of said second transmission line disposed between said second and third directional couplers, thereby adapting said test set to measure the power output level of said radio transmitter.

3. A radio frequency power test set for alternatively testing the power output level of a radio transmitter and the input power sensitivity of a radio receiver comprising, first, second, and third guided wave transmission lines, each of said transmission lines having a first and a second end, means terminating said second end of each of said transmission lines and said first end of said third transmission line in a matched termination, a source of radio frequency energy coupled to said first end of said first transmission line, a first directional coupler coupling a point in said first transmission line at a point adjacent said second end thereof to a point in said third transmission line adjacent said first end thereof, a second directional coupler coupling a point in said third transmission line adjacent said second end thereof to a point in said second transmission line adjacent said first end thereof, a third directional coupler coupling a point in said second transmission line intermediate said second directional coupler and said second end of said second transmission line to a point in said first transmission line adjacent a first end thereof, power measuring means disposed in said first transmission line at a point intermediate said first directional coupler and said second end of said first transmission line, frequency measuring means coupled to said first transmission line at a point intermediate said third directional coupler and said second end of said first transmission line, a calibrated variable attenuator coupled to said first end of said second transmission line, coupling means coupled to said calibrated variable attenuator and adapted to receive alternatively the output circuit of said radio transmitter to be tested and the input circuit of said receiver to be tested, and a two position switch means movable from a position within said second transmission line at a point intermediate said second and third directional couplers to a point outside said second transmission line, said switch means when within said second transmission line effectively blocking the transmission of energy in the section of said second transmission line between said second and third directional couplers thereby adapting said test set to measure the power input sensitivity of said receiver, said switch when in said position outside said second transmission line permitting the transmission of energy in the section of said second transmission line diposed between said second and third directional couplers, thereby adapting said test set to measure the power output level of said radio transmitter.

4. A radio frequency power test set for alternatively testing the power output level of a radio transmitter and the input power sensitivity of a radio receiver comprising, first, second and third guided wave transmission lines, each of said lines having a first and a second end, means terminating said second end of each of said transmission lines and said first end of said third transmission line in a matched termination, a source of radio frequency energy, a first variable attenuator coupling said source of radio frequency energy to said first end of said first transmission line, a first directional coupler coupling a point in said first transmission line to a point adjacent said second end thereof to a point in said third transmission line adjacent said first end thereof, a second directional coupler coupling a point in said third transmission line adjacent said second end thereof to a point in said second transmission line adjacent said first end thereof, a third directional coupler coupling a point in said second transmission line intermediate said second directional coupler and said second end of said second transmission line to a point in said first transmission line adjacent said first end thereof, said third directional coupler having a greater attenuation than said first and second directional couplers, power measuring means disposed in said first transmission line at a point intermediate said first directional coupler and said second end of said first transmission line, frequency measuring means coupled to said first transmission line at a point intermediate said third directional coupler and said second end of said first transmission line, coupling means to which may alternatively be connected to the output circuit of said radio transmitter to be tested and the input circuit of said receiver to be tested, a second calibrated variable attenuator coupling said coupling means to said first end of said second transmission line, and a two position switch means movable from a position within said second transmission line at a point intermediate said second and third directional couplers to a point outside said second transmission line, said switch means when within said second transmission line providing a matched termination for the section of said second transmission line included between said switch and said second directional coupler and a matched termination for the section of said second transmission line included between said switch and said third directional coupler, thereby adapting said test set to measure the power input sensitivity of a receiver, said switch when in said position outside said second transmission line permitting the transmission of energy in the section of said second transmission line disposed between said second and third directional couplers, thereby adapting said test set to measure the power output level of a radio transmitter.

ROBERT A. RAPUANO.

REFERENCES CITED

The following references are of record in the file of this patent:

UNITED STATES PATENTS

| Number | Name | Date |
| --- | --- | --- |
| 2,375,223 | Hansen | May 8, 1945 |
| 2,412,393 | Ghosh | Dec. 10, 1946 |